H. HESS.
BALL BEARING.
APPLICATION FILED MAR. 11, 1909.
967,519.
Patented Aug. 16, 1910.
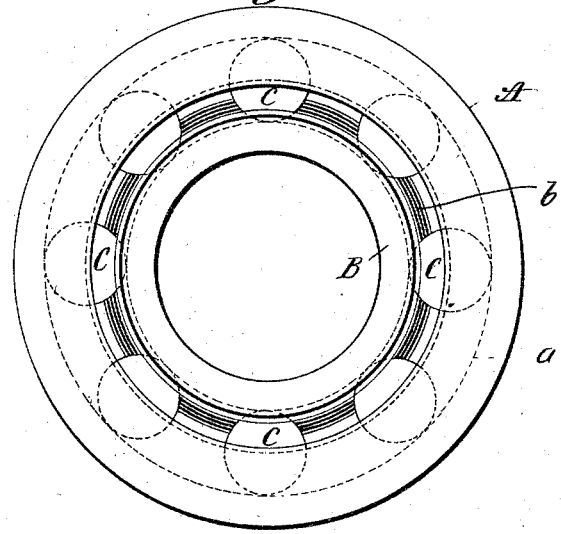
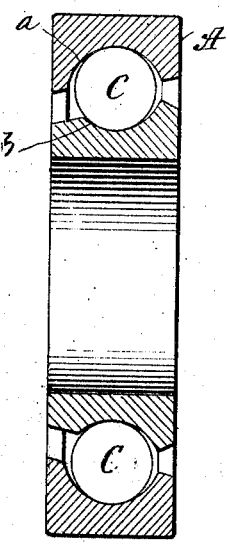
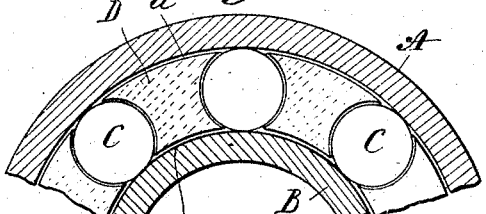
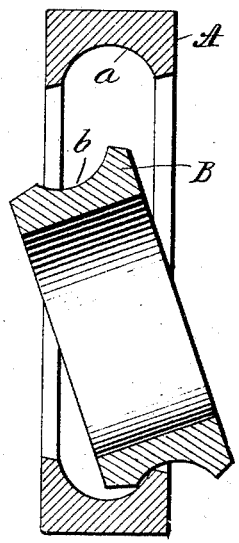
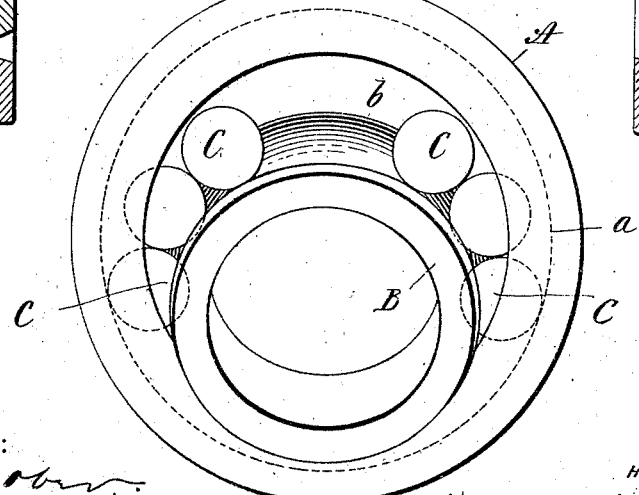
Witnesses:
Inventor:
HENRY HESS
By his Attorneys

UNITED STATES PATENT OFFICE.

HENRY HESS, OF WAWA, PENNSYLVANIA.

BALL-BEARING.

967,519.  Specification of Letters Patent.  Patented Aug. 16, 1910.

Application filed March 11, 1909. Serial No. 482,789.

*To all whom it may concern:*

Be it known that I, HENRY HESS, a citizen of the United States, residing at Wawa, in the county of Delaware and State of Pennsylvania, have invented certain new and useful Improvements in Ball-Bearings, of which the following is a specification, reference being had therein to the accompanying drawing.

My invention relates to ball bearings, and more particularly to that class thereof provided with uninterrupted or continuous tracks or ways for the balls.

It is the object of my invention to provide a bearing which will sustain the maximum of end thrust in addition to its ordinary radial capacity, and to this end I propose to deepen the ball grooves to the greatest extent possible, the ability of the bearing to withstand side pressure being proportional to the depth of the tracks or ways.

In order to secure the advantages arising from the uninterrupted tracks, it becomes necessary to assemble the parts by the relative displacement of the casing members. For instance, in bearings of the well-known Conrad type, they are assembled by eccentric displacement, but due to the extreme depth of the grooves in the present instance, the eccentric shifting of the rings to an extent sufficient to permit the insertion of the balls becomes impossible. I therefore propose to displace the rings both eccentrically and by tilting to permit of the desired result.

I have shown my invention in a preferred form of embodiment, but obviously many changes and variations may be made therein without departing from the spirit of the invention, and I desire to be understood that it is not limited to any specific form or arrangement of parts, except in so far as such limitations are specified in the claims.

Referring to the drawing: Figure 1 is a side view of a bearing embodying my invention; Fig. 2 is a transverse sectional view thereof; Fig. 3 is a similar sectional view, but showing the rings relatively displaced to permit of assemblage; Fig. 4 is a side view of the bearing with the rings relatively displaced and illustrating the method of assemblage; and Fig. 5 is a sectional detail view showing one means of spacing the balls.

The bearing comprises the outer ring A and the inner ring B formed respectively with the tracks or ways $a$ and $b$, wherein are located the balls C, in the customary and well-known manner. It is to be noted that the tracks or ways $a$, $b$, are of the continuous or uninterrupted type, whereby the disadvantages of filling openings and similar means for introducing the balls are obviated. It is also to be observed that the grooves are much deeper than in the ordinary type of bearing, and that thereby the ability to withstand side thrust is largely increased. As before stated, this deepening of the grooves results in bringing the opposite projecting flanges of the bearing rings into such close proximity as to prevent their eccentric displacement to a sufficient extent to allow the introduction of the balls, as will be clearly apparent from the drawing. In the form shown therein, the projecting flanges of the rings, which constitute the side walls of the grooves, are of different diameter, that is to say, one flange of each ring projects toward the other ring to a greater extent than its other flange. This results in placing the circular openings between the rings at different radial locations on opposite sides of the bearing, as will also be clearly seen from the drawing. Due to this form of construction and the considerable depth of the grooves, it becomes impossible to displace the rings eccentrically with relation to each other to a sufficient extent to admit the balls between them, and I therefore assemble the parts by a combination of eccentric and tilting displacement, as clearly shown in Figs. 3 and 4. After the balls are introduced in this manner the rings are straightened and brought to concentric relations, after which the balls are distributed circumferentially around the raceway, as shown in Fig. 1. In order to separate and space the balls, any suitable or desirable devices may be employed, and the particular means constitute no part of my present invention. For purposes of illustration I have shown in Fig. 5 a solid ring D in the form of a cage to separate the balls. Such ring may be formed by casting in the well-known manner after the bearing is otherwise assembled. However, as before stated, I do not limit myself to any specific form of cage or separator.

Many variations will suggest themselves to those skilled in the art, and will be equally comprised within the scope of my invention.

Having thus described my invention, its construction and mode of operation, what I claim and desire to secure by Letters Patent of the United States is as follows:

1. A ball bearing including two concentric rings having opposed deep grooves on their adjacent faces, the sides of said grooves being uninterrupted throughout their circumference, and balls mounted in said grooves, the said rings being located in such close relation to each other as to prevent the passage of balls between them by eccentric displacement of the rings alone, but adapted to admit balls to the grooved space between them by both eccentric and tilting displacement of the rings.

2. A ball bearing including two concentric rings having opposed deep grooves on their adjacent faces, the sides of said grooves engaging the balls to resist side thrust, said sides being uninterrupted throughout their circumference, and balls mounted in said grooves, the said rings being located in such close relation to each other as to prevent the passage of balls between them by eccentric displacement of the rings alone, but adapted to admit balls to the grooved space between them by both eccentric and tilting displacement of the rings.

3. A ball bearing including two concentric rings having opposed deep grooves on their adjacent faces, and balls mounted in said grooves, the sides of said grooves engaging the balls to resist side thrust, the said rings being located in such close relation to each other as to prevent the passage of balls between them by eccentric displacement of the rings alone, but adapted to admit a limited number of balls to the grooved space between them by the conjoint eccentric and tilting displacement of the rings, and means for spacing the balls around the entire length of the grooves.

4. A ball bearing including two concentric rings, each formed with two projecting flanges of different diameter, which flanges constitute the side walls of deep grooves for the balls, and balls mounted in said grooves, the sides of said grooves being uninterrupted throughout their circumference, the said flanges being located in such close relation to each other as to prevent the passage of balls between them by eccentric displacement of the rings alone, but adapted to admit balls to the grooves by both eccentric and tilting displacement of the rings.

In testimony whereof I have affixed my signature in presence of two witnesses.

HENRY HESS.

Witnesses:
MARY M'CALLA,
NETTIE L. HAHN.